Figure 1:
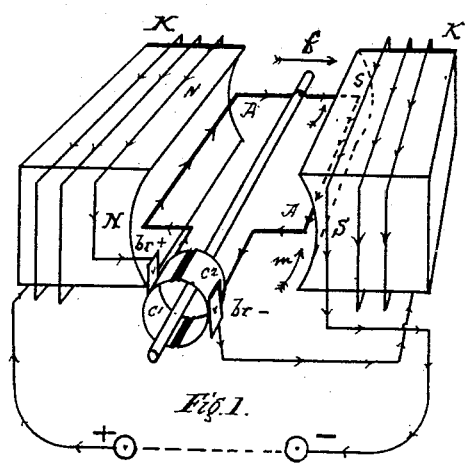

(No Model.) 8 Sheets—Sheet 1.

F. J. PATTEN.
DYNAMO ELECTRIC MACHINE AND MOTOR.

No. 397,439. Patented Feb. 5, 1889.

WITNESSES:
J. W. Lorr
Jos. Wetzler

INVENTOR,
Francis Jarvis Patten (No Model.)  8 Sheets—Sheet 2.

F. J. PATTEN.
DYNAMO ELECTRIC MACHINE AND MOTOR.

No. 397,439. Patented Feb. 5, 1889.

WITNESSES:
C. H. L'Hommedieu
J. W. Lore

INVENTOR,
Francis Jarvis Patten (No Model.)  
F. J. PATTEN.  
DYNAMO ELECTRIC MACHINE AND MOTOR.  
No. 397,439. Patented Feb. 5, 1889.

WITNESSES:

INVENTOR, (No Model.) 8 Sheets—Sheet 7.

F. J. PATTEN.
DYNAMO ELECTRIC MACHINE AND MOTOR.

No. 397,439. Patented Feb. 5, 1889.

WITNESSES: INVENTOR, (No Model.)　　　　　　　F. J. PATTEN.　　　　8 Sheets—Sheet 8.
DYNAMO ELECTRIC MACHINE AND MOTOR.

No. 397,439.　　　　　　　　Patented Feb. 5, 1889.

WITNESSES:　　　　　　　　　　　　INVENTOR.

UNITED STATES PATENT OFFICE.

FRANCIS JARVIS PATTEN, OF NEW YORK, N. Y.

DYNAMO-ELECTRIC MACHINE AND MOTOR.

SPECIFICATION forming part of Letters Patent No. 397,439, dated February 5, 1889.

Application filed July 13, 1888. Serial No. 279,861. (No model.)

*To all whom it may concern:*

Be it known that I, FRANCIS JARVIS PATTEN, a citizen of the United States, residing at New York, in the county of New York and State of New York, have invented certain new and useful Improvements in Dynamo-Electric Machines, of which the following is a description.

My invention consists in a novel system of construction for dynamo-electric machines and motors, and relates mainly to a new system of armature winding and connections as well as the arrangement of the armature and field circuits with respect to each other, by which I secure results not otherwise obtainable.

The object of the invention is to produce an electric motor which may be interposed in a circuit over which passes a continuous current or an alternating current, and yet will be operated in either case, and to produce a machine which, when driven as a generator, may produce either direct or alternating currents.

To these ends my invention consists in providing a machine with two external loops in operative relation to the field-magnet and armature circuits, and so connected that if a source of direct current be interposed in one loop or a source of alternating current in the other the motor will be operative, while, on the other hand, if the machine be driven as a generator direct or alternating currents will flow through the respective loops.

My invention further consists in providing the field-magnet or armature circuit of a machine with an external loop taken from points intermediate between the terminals of the machine through which the current-producing motion or that produced by the operation of the machine as a generator will circulate.

My invention also embodies other features which will be more particularly set forth in the accompanying specification and will be definitely indicated in the appended claims.

My invention is applicable to all forms and classes of such machines, direct or alternating, and whether the armature be of one type or another. To explain the fundamental principle upon which my invention is based it will be necessary to first examine the operativeness of the essential parts in the two types—direct and alternating current machines.

In the figures similar parts are lettered alike. In the circuits arrow-points show direction of current flow, always from a positive to a negative terminal. In a magnetic field arrows indicate the "positive direction" of the lines of force, and curved arrows indicate the direction of armature or field motion under existing conditions.

Fixed unchanging poles of a field of force are lettered N and S. An alternating field, or one the poles of which are periodically reversed, is indicated by a double designation—thus $\frac{n}{s}$ or $\frac{s}{n}$, the upper letters representing the existing condition of the alternating pole.

Figure 2:
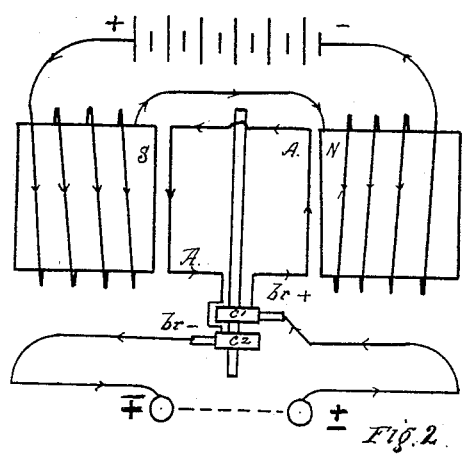
Figure 3:
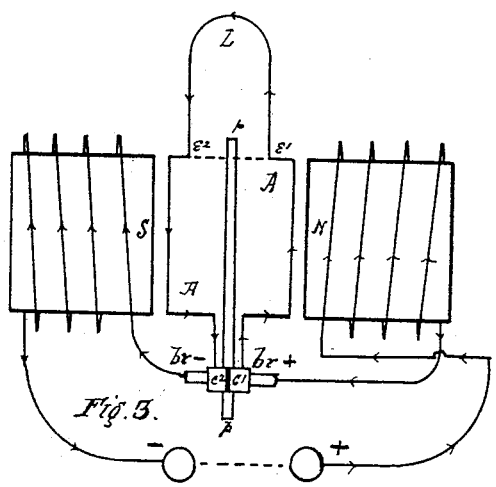
Figure 4:
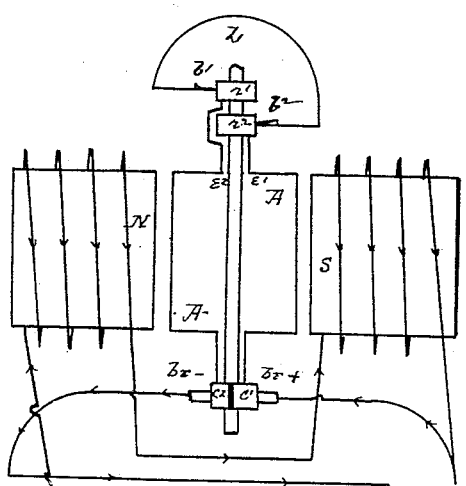
Figure 5:
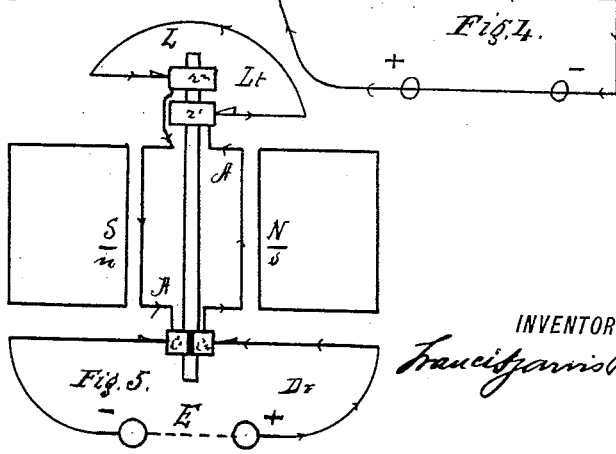
Figure 7:
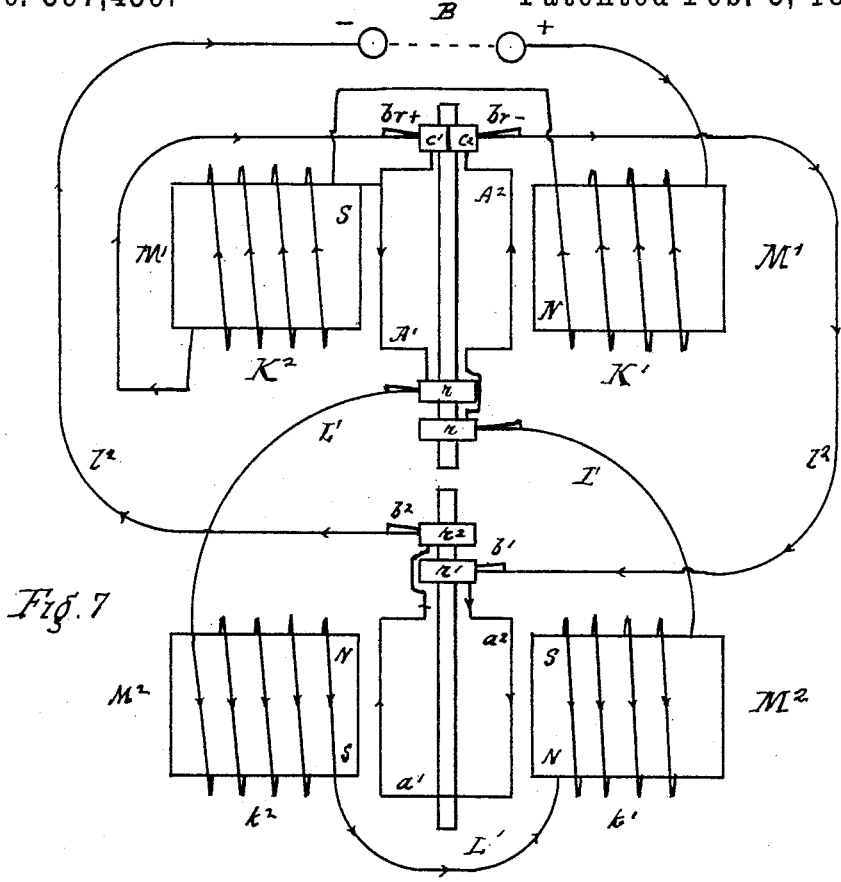
Figure 6:
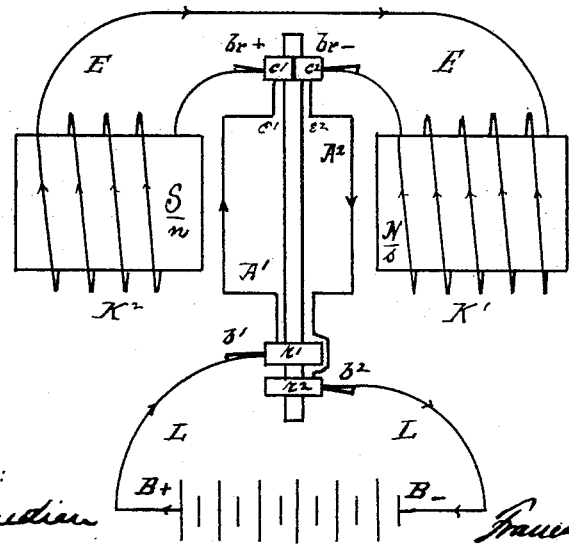
Figure 8:
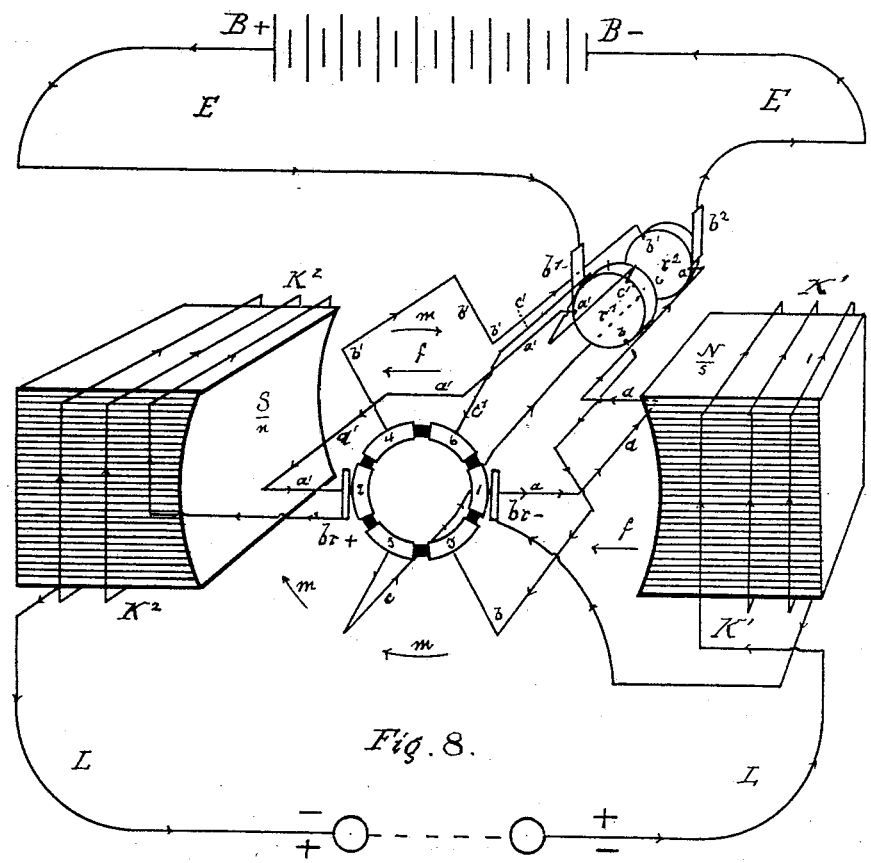
Figure 9:
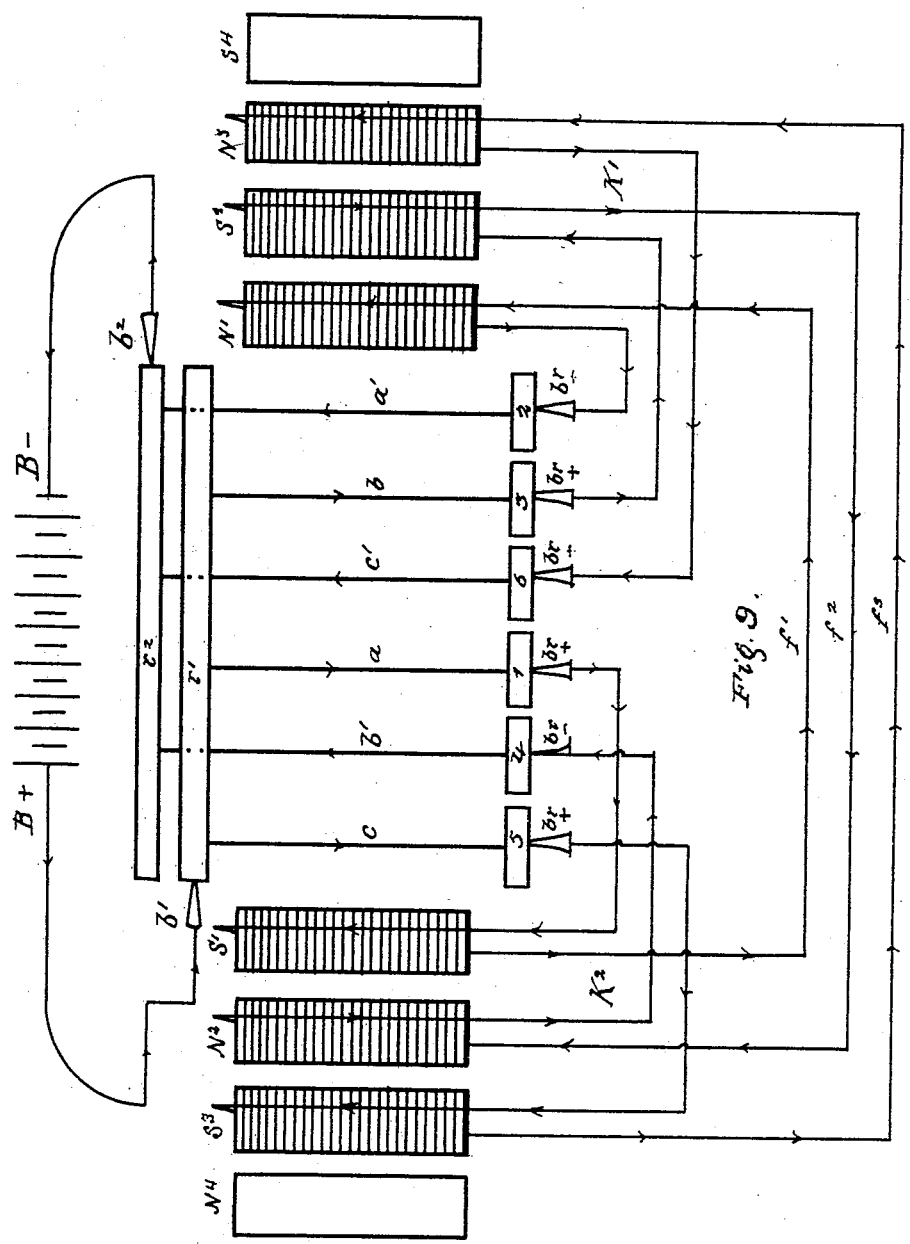
Figure 10:
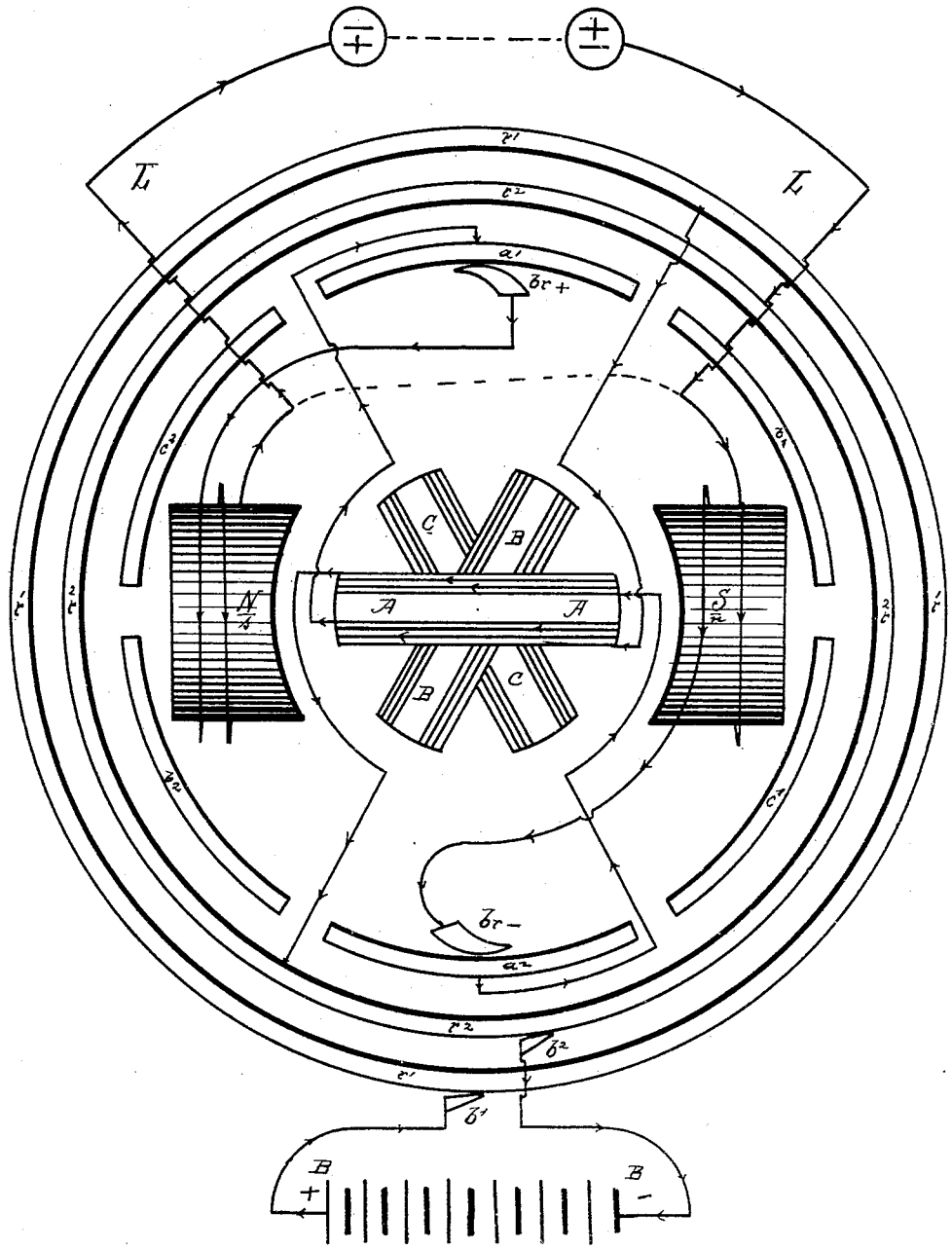
Figure 11:
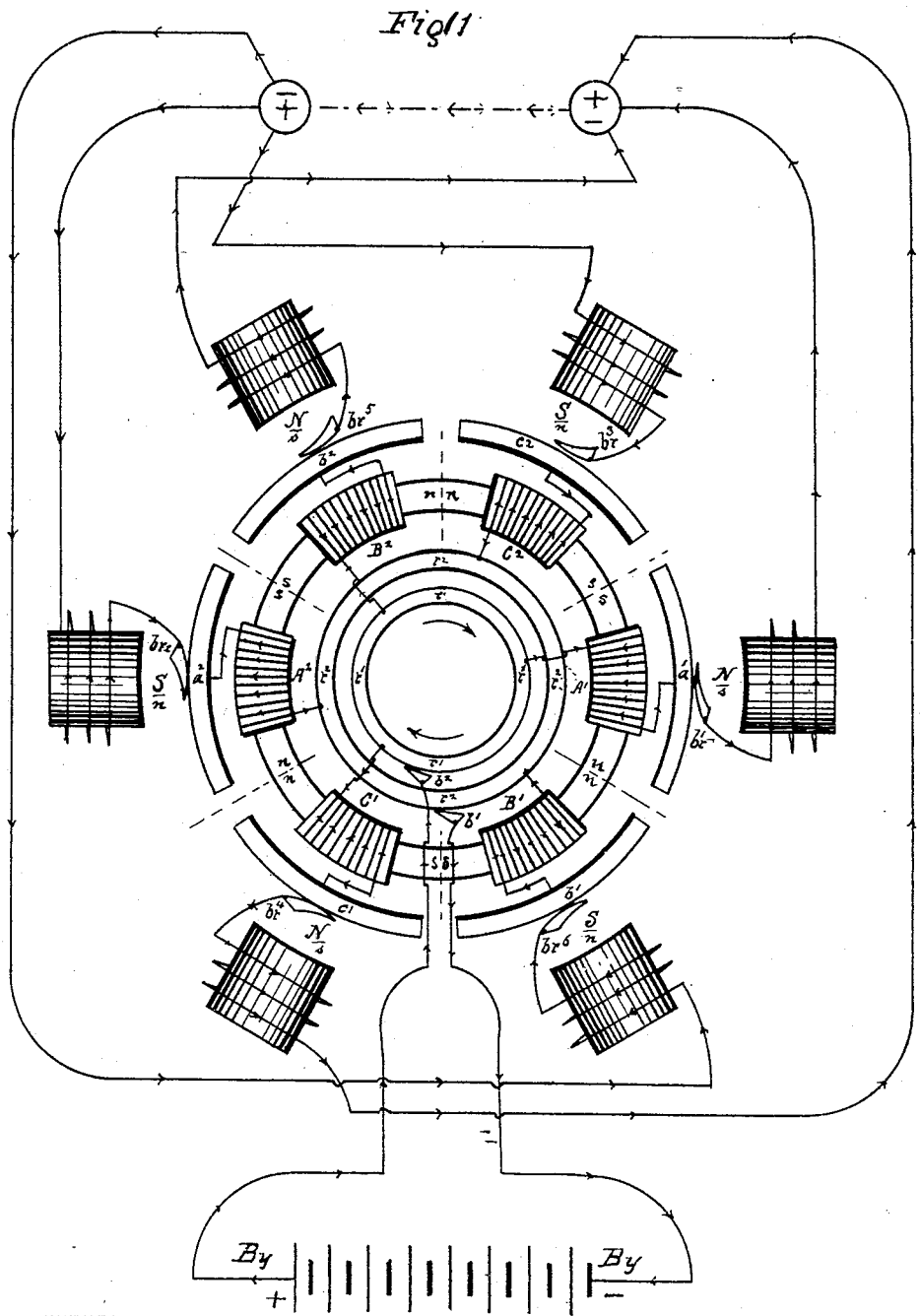
Figure 12:
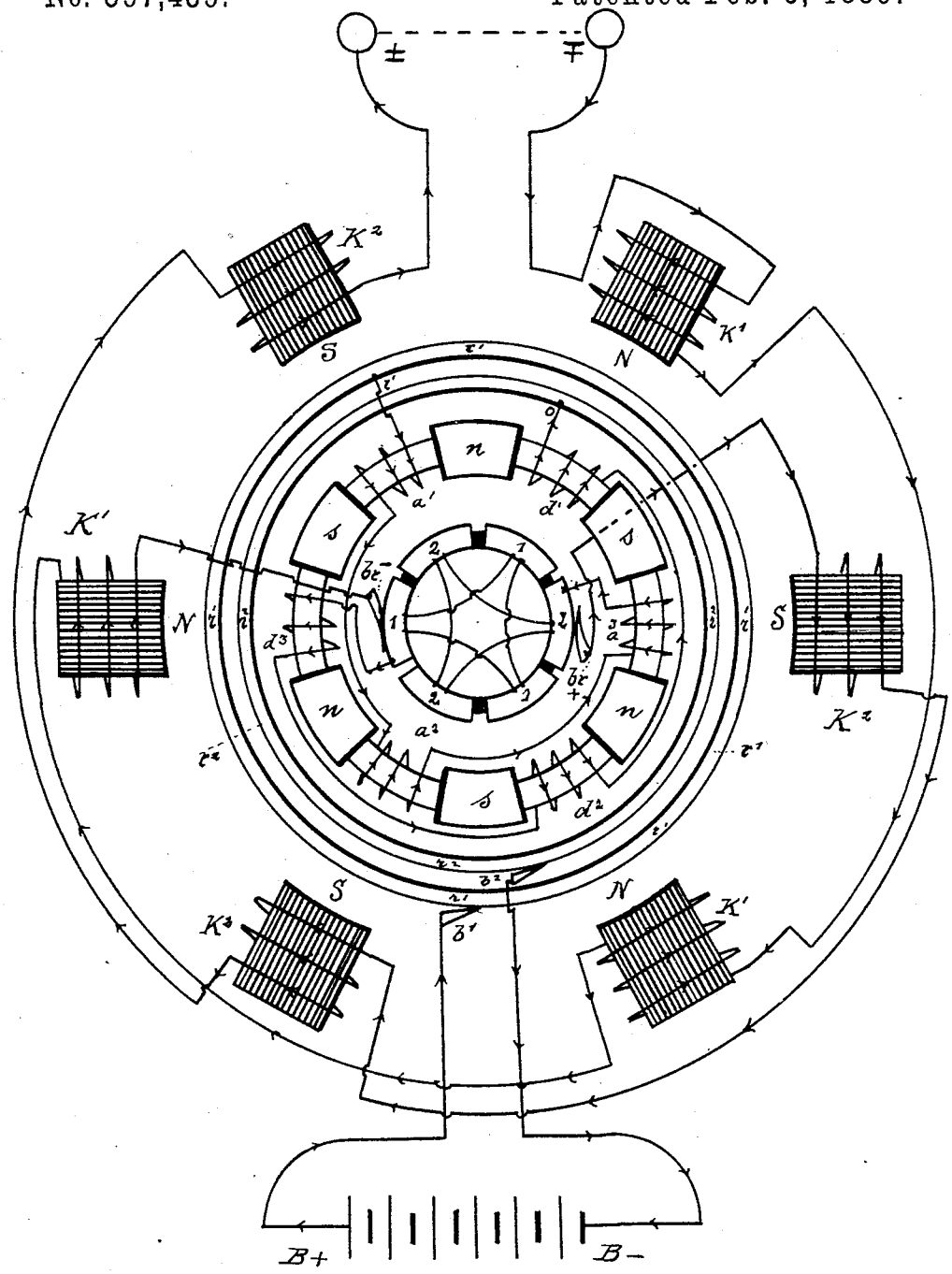
Figure 13:
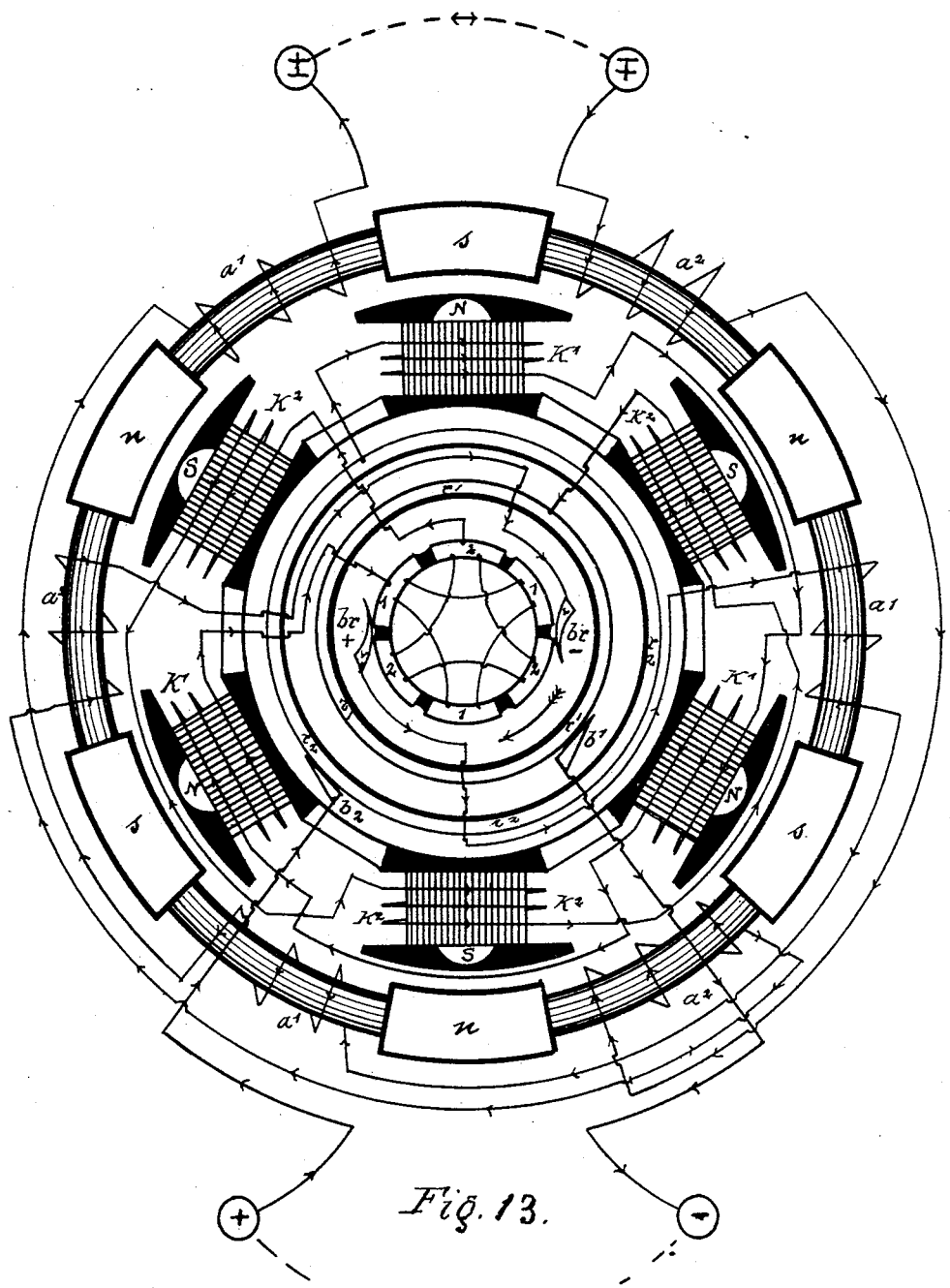

In the drawings, Figure 1 represents by diagram the circuits and essential parts of an ordinary direct-current dynamo or motor, the action indicated representing the latter; Fig. 2, an ordinary alternating-current machine. Fig. 3 illustrates the principle applied in my system of construction. Fig. 4 illustrates its application to machines of all types. Fig. 5 illustrates the resulting current flow in different circuits of the same machine under different conditions. Fig. 6 shows an application of my system to motor construction by a simple diagram of parts. Fig. 7 shows an application of my system to two motors, connecting them in such a way that they will revolve synchronously. Fig. 8 shows the operative parts of a motor constructed upon my system, which will work when connected in either an alternating or a direct current circuit. Fig. 9 shows by diagram the operation of different parts of the same machine at different phases of a half-revolution. Fig. 10 shows the different operative parts of the same machine and their relative connection by diagram. Fig. 11 shows by diagram a machine constructed upon the same principle, but provided with multiple field-circuits, both the armature and field circuits being connected in multiple arc. Fig. 12 shows by diagram another machine constructed upon the same principle as that illustrated in Fig. 6, but having multiple field-circuits and multiple armature-circuits, the different successive parts of each being connected in series with each other. Fig. 13 shows by diagram the application of my system to the construction of a single or double circuit self-exciting dynamo capable of giving either a direct or an alternating current in the external circuits, or both.

In Fig. 1 are pictured the different parts of an ordinary direct-current machine, (motor.) The current is continuous through a single circuit, always in the same direction, except in the armature-circuit proper, where, by operation of the two-part commutator, its direction is reversed at each half-revolution of the armature.

In Fig. 2 is presented the typical alternating-machine, the fields permanently excited by a continuous current of one direction and the armature of a motor by an alternating current from a separate source $\pm$ and $\mp$, and the periodic alternations in the armature-circuit must correspond in time to the half-revolutions of the armature, as before. The alternating-current is led into the armature through the brushes $br+$ and $br-$, which bear on the insulated rings $c'$ and $c^2$, to which the terminals of the armature are connected. In this type of machine the current in the armature is not commuted, but is alternated in direction by apparatus external to the machine itself. There is, however, no difference in the functions of like parts in the two types of machines. In both there must be an alternating current in the armature-circuit, and in both these reversals must correspond to half-revolutions of the armature in the case of a simple two-pole machine, and a direct-current machine has an alternating current in its armature-circuit the same as an alternating-current machine.

Referring now to Fig. 3, which is a simple diagram of a direct-current motor of the Siemens type having a loop, L, attached at the points $E'$ and $E^2$ of the armature-circuit A A, and the armature-coil being open at the points $E'$ and $E^2$, the loop L forms a part of the armature-circuit proper, and as the armature turns this loop also will be traversed by alternating currents. The loop L, however, need not turn with the armature, and Fig. 4 shows the device by which this loop may be made independent of and external to the armature-circuit proper, while yet forming a part of it. The armature-terminals are connected in the usual way to the segments of an ordinary reversing-commutator; but instead of forming a simple closed circuit it is broken at the points $E'$ and $E^2$, and these middle terminals of the armature-circuit are secured to two independent insulated ring-contacts, $r'$ and $r^2$, upon which bear two other brushes, $b'$ and $b^2$, and to these the loop L is fastened. Arranged thus the loop L, though connected to the armature and forming a part of its circuit, is external thereto and independent of it. This constitutes the essential feature of my invention, and it is capable of many varied and useful applications, a number of which will be described in detail.

Referring to Fig. 5, it is plain that if a direct current is sent through the external circuit, E, an alternating current will flow in the loop L, and, conversely, if a direct current is sent through the loop L and the armature-circuit proper, A A, then an alternating current will flow in the external circuit, E, because its direction in the external circuit, E, will be reversed at each half-revolution by action of the reversing-commutator $c'$ $c^2$. This simple alteration in the relative functions of the two external loops lays the foundation for a novel system of motor construction and arrangement of armature and field circuits. It will therefore be evident that in the type of machine illustrated in Fig. 5 the armature-circuit is open at both ends and connected through brushes to two independent loops, in either of which, if a source of direct current be inserted, alternate currents will circulate in the other. Either of these may therefore be considered the external circuit of the machine, and the other will be a closed loop connecting two points intermediate between the terminals of the machine.

It will be observed that sending a direct current through the loop L, Fig. 6, as shown by the battery-connections in the figure, a continuous direct current must flow in the armature-circuit proper, A A, being always in the same direction in the armature-circuit, and the armature cannot revolve unless now the field-magnetism is reversed at each half-revolution of the armature-circuit—i. e., each field-pole must be alternately N and S, changing polarity at each half-revolution. This can only be effected by changing periodically the direction of the current in the field-circuits at each half-revolution of the armature, and we find a convenient means of doing this by making a field-circuit of the external circuit, E, and inserting a source of direct current in the loop L and the armature-circuit proper. If, therefore, the loop E, Fig. 5, is coiled around the field as in Fig. 6, the requisite condition that the armature shall turn will be fulfilled—namely, that the field-magnetism shall be reversed at each half-revolution, while the direction of the current in the armature remains unchanged. Fig. 6 presents, therefore, a new form of "direct-current" motor, so called, because it is actuated by an external source of direct-current energy, and in which the current is continuous in the armature-circuit proper. It will be observed that the armature-circuit is open at a midway point, $E'$ $E^2$, between the main terminals $C'$ $C^2$, where the current enters the machine, and these intermediate terminals are connected to commutator-segments $c'$ $c^2$, against which the brushes $br+$ and $br-$ bear, and to these brushes, which are in fact the middle point of the armature-circuit, the field-circuits $K'$ and $K^2$ are connected in such a way that the field-coils are included in the armature-circuit—i. e., midway between its terminals—and in this midway loop the current is reversed at each half-revolution, thus reversing the field-magnetism instead of reversing, as is usual, the direction of the current in the armature-circuit. Another application of this principle is shown in Fig. 7, where two motors, M' and M², are connected in such a way that they move synchronously with each other.

M' is a direct-current motor of the ordinary type, except that it is provided with the external armature-loop, L', first shown in Fig. 4, and which constitutes the basis of my system of construction. The motor M' receives direct current from the source B+ B−, which flows from the + pole around the fields N and S of this machine, then to the brush br+, bearing on the reversing-commutator c' c², into the armature-circuit on the side A' to the ring r, through the loop L', and back to ring r, half of armature A², out through brush br−, through l² to ring r' of motor M², through the armature-circuit a' a² of motor M² as a direct current, and back to the ring r² of machine M², thence through brush b² and loop l² back to the terminal B− of the source of direct current, thus completing the entire circuit.

In the armature A' A² of the motor M' and in the loop L' L', connected to it through the rings r r, there is an alternating current reversed at each half-revolution of the armature A' A² of the motor M'; but in all the rest of the circuit there is a continuous current of one direction—i. e., in the field-coils of the motor M' and the armature of the motor M²; but as all these parts are in a single continuous circuit, which is unbroken from B+ to B−, the alternations of current must be simultaneous throughout—i. e., in the armature of machine M' and field of the machine M²—and the two machines thus connected will revolve in absolute synchronism and resist any effort to disturb their synchronous motion. This system of motor construction gives, therefore, a simple and effective means of synchronizing two independent direct-current machines.

According to my system of armature construction such motors will run equally well in an alternating or in a direct current circuit, and used as dynamos they will yield either current or both at the same time. Used as a direct-current motor the machine has a continuous rotary torque and absolutely no dead-center. A simple form of such machine is shown in Fig. 8, being a perspective diagram of the operative parts and circuits. It is precisely the same in principle as that shown in Fig. 6, the application being somewhat more extended, the chief difference being that instead of there being only a single armature-coil, as shown in Fig. 6, there are a number of independent armature-coils that come successively into action, as each approaches the position of maximum effort twice during each revolution.

The machine (motor) illustrated in Fig. 8 has three independent armature-coils, one complete turn of each being shown and designated in the figure as $a$ $a'$ $b$ $b'$ $c$ $c'$. Each is an open circuit broken at a point midway between its main terminals, the two open ends thus formed being connected to the two insulated contact-rings $r'$ and $r^2$, while the midway or open terminals are connected to the opposite parts of a segmental reversing-commutator having twice as many segments as there are complete armature-coils. Two brushes, $br+$ and $br-$, bear upon this commutator at opposite points of a diameter, and through these brushes and an external circuit connecting them forming the armature-loop before described. Each armature-coil is closed in turn as it comes into a position of maximum action with respect to the field. Each armature coil or winding begins at one insulated ring and ends at the other; but the connections of like parts are reversed alternately—i. e., one begins at the ring $r'$—say the coil $a'$—and ends at ring $r^2$, the next coil $b'$ on the same side begins at $r^2$ and ends at $r'$, &c. Viewed as a direct-current motor the circuits in operation in the position shown will be traced. From the source of direct current B+ B− the current flows to the brush $b'$, through the half-armature circuit $a'$, to the segment 2 of the reversing-commutator, through the brush $br+$ into the field-circuit K², making a south pole at $\frac{s}{n}$ through the external loop, L L, to the field-coils K', making a north-pole at $\frac{n}{s}$ back to brush $br-$, through the remaining half-armature circuit, $a$ $a$, to ring $r^2$, and through the brush $b^2$ back to battery at the pole B−, thus completing the circuit, which is always the same, except that the circuit is completed through each pair of half-armature coils in rotation as their segments come under the brushes $br+$ and $br-$.

An examination of the connections will show that there is always a direct current in the armature-circuit proper and a continuously-alternating current in the external loop, L L, and the field-coils K' and K², which is reversed each time a new half-armature coil is brought into action by its segment coming under the brushes $br+$ and $br-$.

A point to be noted is the fact that there is always a direct current in the external circuit, E E, and therefore the motor will run when a source of direct current is inserted in this circuit; but there is always an alternating current in the external loop, L L, and therefore the machine will run when a source of alternating current is included between the poles ± and ∓. It is further evident that the machine can be made to run at a slow speed compared to the number of alternations per revolution of the generator by simply providing the armature with a large number of coils, as each alternation corresponds to the passage of one commutator-segment only under the brushes.

In Fig. 9 is shown by a simple diagram the progressive phases that occur during one-half of a revolution of the armature shown in Fig. 8. To make this plain, the armature and its commutator and rings are developed into a plane surface or unrolled, and there is an independent field and set of field-circuits and brushes shown for each successive step pictured. Thus, when the armature-coil $a\ a'$ is in action through the segments 1 and 2 and brushes $br+$ and $br-$, the field-circuit $f'$ produces the fields N' and S'. Then the armature-circuit $b\ b'$ comes into action and in like manner produces the fields $N^2\ S^2$ through circuits $f^2$, the field-circuits being simply repeated for each successive change.

Fig. 10 is another diagram showing the operative parts and connections of the same machine, Fig. 8. Here the two rings $r'$ and $r^2$ are shown exterior to all the parts for clearness. Brushes $b'$ and $b^2$ send the current in through them from the source B+ and B− to the armature-coils A A B B C C, each of which is connected in rotation to the field-circuit L L as their respective commutator-segments $a'$ $a^2, b'\ b^2$, and $c'\ c^2$ come under the brushes $br+$ and $br-$. Evidently a source of alternating current connected in circuit between the terminals $\pm$ and $\mp$ would also run the motor.

Another form of machine is shown in Fig. 11, which may be described as a multiple-arc machine. It is the same in principle as the fundamental form shown in Fig. 6, and only differs from that shown in Figs. 8 and 10 in that it has as many independent fields as there are armature-coils, so that each set or pair of armature-coils is continuously in action with respect to one of the fields. It results from this arrangement that there is a constant pull exerted on the armature all around the circumference. In this and subsequent forms ring-armatures are shown, as the principle is equally applicable to any form, and where all the armature-circuits are required in action at once the ring form of armature-core is preferable for many reasons, as will be seen. From the main terminal rings $r'$ and $r^2$, common to all this type of machines, there are taken six independent coils, the terminals through which current enters the coils being all connected to the ring $r'$, and those through which it leaves to the ring $r^2$, as before. These six coils, Fig. 11, may be regarded as forming the halves of three complete and distinct armature-windings, and they are connected, as shown, so as to form six consequent poles in the armature-ring $n\ n\ s\ s$, &c., and as the current is always continuously in the same direction in these armature-coils the poles $n\ n\ s\ s$, &c., do not change position in the ring, but are permanent consequent poles, and they turn with the armature as it revolves—a point that constitutes a peculiar feature of the type of machine I have invented The outer terminals or midway terminals of each opposite pair of coils, Fig. 11, are secured to the opposite segments of a ring-commutator, $a^2\ a^2\ b'\ b^2\ c'\ c^2$, and upon each such pair of opposite commutator-segments a separate independent pair of fixed brushes is caused to bear, and to these brushes three independent sets of field-circuits are connected, and these field-circuits are wound around the two field-magnets opposite the two field-brushes. Then all the field-circuits in which the current is flowing one way—say away from the center—are taken to one terminal, $\pm$, and the others are taken to the opposite terminal, $\mp$, between which two points the current will then always be in the same direction for all the circuits. As a result of this arrangement we have a multiple-arc motor for either direct or alternating currents. The essential peculiarities are a plurality of armature-circuits, each open at a midway terminal and then joined each to a separate field-circuit, permanent consequent poles produced in the armature-core by the armature-coils, and alternating field polarities in the field-circuits through the reversing-commutator.

In Fig. 12 is shown another form of motor involving simply another application of the fundamental principle shown in Figs. 6 and 8. In this machine, Fig. 12, we have, as before shown in Fig. 11, a machine with a plurality of armature-coils and a corresponding number of field-circuits; but instead of having these different circuits connected in multiple arc they are now shown all connected in series in continuous single uninterrupted circuit and all simultaneously in action. As the means by which this result can be brought about requires a somewhat different application of the fundamental principle used, (the external armature-loops,) a more detailed description will be necessary. Starting from the insulated ring $r'$, the armature-circuit is first wound through the alternate coils $a'\ a^2\ a^3$, and is then connected to the commutator-segment 2, thus completing one-half of the entire armature-winding, leaving north poles at the rear as the coils progress around the ring. The circuit then continues from the segment 2, through the brush $br+$, to the three field-magnet windings $K^2\ K^2\ K^2$, making the three south poles S S S of the field opposite the armature-coils already wound. The circuit is then taken to the poles $\pm$ and $\mp$, and then starts back to the armature through the three alternate north field-coils, K' K' K', making north poles opposite the three armature-coils as yet unwound, completing the field-circuits, the wire returns to the brush $br-$, bearing on segment No. 1, whence the current flows through the three armature-coils $d^3\ d^2\ d'$, alternating in position with those first wound, and all the last series so wound as to produce a north pole at their front ends as they proceed around the ring. The circuit is then taken to ring $r^2$, and returns through the brush $b^2$ back to the battery or negative pole of the motor B−, thus completing six coils for armature and six coils for fields in a single circuit. An examination of the circuits and connections will show that the armature-windings all produce permanent consequent poles at the points $n\ s\ n\ s$ around the armature, and they turn with it, while the field-poles become simultaneously of north or south polarity as the brushes pass from any one pair of the opposite segments of the commutator to the other, and the segments are so placed that this reversal of field-magnetism will occur at the instant the poles of the ring are opposite those of the field. To produce the result and have all the circuits described continuously in a single series, a peculiar form of commutator is used. It is not a commutator in the ordinary sense of the word, but is simply a current-changer, the alternate segments 1 1 1 all being connected together in one group, and the other three segments, 2 2 2, form another group. The machine here shown in Fig. 12, it will be observed, is a wide departure from the ordinary form of motors, and is essentially different in principle, and forms a distinct type from the "Gramme ring" or the "Siemens drum" armature. The winding is distinctive and has this peculiarity to be noted, that all the coils of the armature are continuously in series all around the ring. The armature-circuit is in series with the field-circuits also, but in a peculiar way—i. e, first come half the armature-circuits in continuous series, then alternate field-circuits in successive series, then the remaining alternate field-circuits in series, and, lastly, the remaining half of the armature-circuits, but all arranged continuously in a single continuous circuit in the order named. It is further to be noted as a peculiarity that the same continuous circuit has an alternating current in one external loop and a direct current in another external loop, so that the machine will run on either current or both. A distinctive feature of this machine is the fact that it has a direct current without the use of any of the ordinary forms of commutator.

Fig. 13 shows by diagram an application of the fundamental principles exhibited in Figs. 6 and 8 to the construction of a dynamo having peculiar properties. It will yield an alternating or a direct current, or both, if desired, at the same time. Thus while supplying a lighting-circuit with an alternating current it may be charging storage-batteries on a direct-current circuit. As will be seen from an inspection of Fig. 13, which represents by diagram the different parts and circuit-connections of the dynamo, it is the same in principle and action as the motor shown in Fig. 12, excepting that the parts are relatively reversed. The fields are internal and revolve, while the armature assumes the form of a fixed external ring, around which the coils are wound and connected in precisely the same manner as in Fig. 12, the only difference being that in the dynamo the field-circuits revolving are connected to the reversing commutator-segments and the external armature-circuit is connected in continuous series to the brushes $br+$ and $br-$. The connections in the dynamo, Fig. 13, are therefore, starting at ring $r'$, outward through half the field-coils $K'$ $K'$ $K'$ to the alternate segments 1 1 1 of the reversing-commutator, out through the brush $br+$ to the three armature-coils $a'$ $a'$ $a'$ in continuous series, then through $a^2$ $a^2$ $a^2$ in consecutive series to brush $br-$, connecting with the segments 2 2 2 of the reversing-commutator, and from one of these to the remaining half of the field-coils $K^2$ $K^2$ $K^3$ in series and back to the insulated ring $r^2$, the circuit being completed through external connections joined to the brushes bearing on the insulated rings. Evidently, therefore, a continuous current of one direction will flow from the pole $-$ to the pole $+$, while an alternating current will flow between any two points of the external armature-circuit, as $\pm$ $\mp$. The construction and system of connections described result therefore in the production of a new type of dynamo which will yield either a direct or an alternating current in an external circuit, or both at the same time. It gives also a direct-current machine in which all the coils of the armature are connected in a single continuous series circuit and not half of them in multiple arc with the other half, as in a Gramme ring or drum armature, and the alternating current primarily generated is redirected into a continuous current without the ordinary form of commutator, but through a device that practically does away with all distortion of the field, and the armature-coils all being in continuous series all around the ring a maximum inductive effect is obtained.

Having thus described my invention, what I claim, and desire to secure by Letters Patent, is the following:

1. A motor provided with a reversing-commutator, the circuit in the motor reversed by said commutator being broken at a point between its terminals and provided with an external loop-circuit, the ends of the loop being in continuous electrical connection with the two sides of the break.

2. A motor provided with an armature-circuit open at an intermediate point between its terminals and in continuous electrical connection with an external loop in which suitable electrical devices may be inserted, and a commutator for reversing current in said armature-circuit.

3. A dynamo-electric machine or motor having connected field-magnet and armature circuits and provided with an external loop in addition to the main external circuit, said loop being connected at its ends, through continuous rubbing contacts, to a break in the internal circuit of the machine, said machine being provided with a reversing-commutator.

4. A dynamo-electric machine or motor provided with a segmental commutator for producing current changes in its internal circuits, the commuted circuit having connected in series with it at a point intermediate of its terminals an external loop, in which the same changes of current will be produced as occur in the commuted circuit.

5. A dynamo-electric machine or motor provided with a commutator for producing a suitable magnetic relation between its field-magnet and armature and having each of its armature-coils connected to two sets of terminals, one set being the reversing-commutator referred to and the other a pair of insulated rings, whereby if a source of alternating current or a source of direct current be connected between one set of terminals and the other set closed the machine will operate as a motor, and whereby alternating or direct currents may be taken from one set or the other of said terminals when the machine is driven as a generator.

6. In a dynamo-electric machine or motor, an armature having its coil or coils provided with two sets of terminals that form parts of a single continuous circuit, one pair connected to insulated ring-contacts and the other pair to the opposite diametral segments of a reversing-commutator, the armature-circuit being closed through two independent external circuits connected to brushes that bear upon the separate pairs of terminals.

7. A dynamo-electric machine or motor having a number of open armature-coils connected to two sets of terminals that are in continuous circuit, one such set being insulated rings and the other set the opposite segments of a reversing-commutator, both pairs of terminals connected through separate brushes to separate external circuits.

8. In a dynamo-electric machine or motor, the armature construction described, comprising an armature-coil the terminals of which are connected to the opposite diametral segments of a reversing-commutator, the circuit of said armature-coil being open at a point midway between said terminals, the open extremities connected to separate insulated ring-contacts, separate brushes bearing on said rings, and the armature-circuit closed through an external loop connected to said brushes.

9. In a dynamo-electric machine or motor, separate independent armature-coils, each having its terminals connected to the same pair of insulated ring-contacts, each coil open at a point midway between said terminals, the open extremities in each coil connected to a separate independent pair of segments of a reversing-commutator, the separate armature-circuits closed successively and in rotation through an external field-circuit as the opposite pair of commutator-segments for each separate armature-coil comes under the brushes bearing thereon, and to which the external field-circuit is connected.

10. In a dynamo-electric machine or motor, an armature-circuit having its terminals connected to separate insulated ring-contacts and midway between said terminals to the opposite diametral segments of a reversing-commutator, a source of direct current connected in the external circuit attached to the brushes bearing on the insulated rings, whereby a current of one direction is maintained in the armature-circuit proper, and an alternating or reversed current is maintained in an external circuit connected to the brushes bearing upon the segments of said reversing-commutator.

11. In a dynamo-electric machine or motor, an armature-coil having its terminals connected to separate insulated ring-contacts, brushes bearing on said ring-contacts that are connected to the poles of a source of direct current, said armature-coils being open at a point midway between the ring-terminals, the midway terminal points of said armature-circuit being connected to the opposite segments of a reversing-commutator, brushes bearing on said commutator, and an external loop-circuit connected to said brushes and including between its terminals the field-coils, whereby the current in said coils and the magnetism of the field are reversed alternately at each half-revolution of said armature.

12. In a dynamo-electric machine or motor, the construction described, comprising an armature-circuit provided with a number of open coils connected all to the same pair of insulated ring-contacts, like ends or terminals of each in reverse order successively, all of said coils open at a point midway between the aforesaid terminals and connected there to the opposite segments of a reversing-commutator, each coil closed in succession as the armature turns through an external field-circuit connected to brushes bearing on said commutator, whereby the field-circuit is supplied with an alternating current when the armature is supplied with a direct current through brushes bearing on the insulated rings and the circuit connected thereto.

13. In a dynamo-electric machine or motor, a ring-armature provided with a number of coils all connected in a single continuous series and a corresponding number of field coils or circuits, also connected in a single series, and all included in an external loop of said armature-circuit included between its two halves and joined thereto through the segments of a reversing-commutator and brushes bearing thereon, the armature-circuit being conected to a pair of insulated ring-contacts.

14. In a dynamo-electric machine or motor, a ring-armature provided with an even number of coils, all connected in a single circuit, the main terminals of said armature-circuit connected to two insulated ring-contacts, and the armature-circuit led from these two ring-contacts through alternate coils of the ring to a pair of midway terminals, the even-numbered coils all joined in a continuous series in one set, and the odd-numbered coils all in series in another set, the remaining terminal of one such set of coils being connected to all the even and that of the other to all the odd numbered divisions of a segmental commutator having as many segments as there are coils on the armature.

15. In a dynamo-electric machine, an even number of field-poles of alternate polarity arranged radially upon an axis of revolution, the field-coils of one polarity all connected in one series and those of the opposite polarity in a second series, each such series or circuit being connected to a separate insulated ring-contact at one end, and one of said circuits to all the even and the other to all the odd numbered divisions of a segmental commutator at the other end, the two forming a single continuous series circuit and connected to each other through a continuous armature-circuit, the terminals of which are connected to a pair of brushes bearing upon opposite points of the segmental commutator, the alternate even-numbered coils of said armature-circuit being connected to one brush and the odd-numbered coils in series to the other brush, the remaining terminals of said armature-circuit being connected through an external alternating-current circuit, and the two brushes bearing on the insulated ring-contacts being connected to each other through an external direct-current circuit.

16. A dynamo-electric machine or motor having its armature-circuit connected to two continuous ring-contacts, the even-numbered coils all connected in one series and the odd-numbered coils in another, said armature-circuit being broken at a midway point, so as to form intermediate terminals, and the field-coils of said machine similarly connected in two alternating series and connected through a reversing-commutator to the midway terminals of said armature-circuit.

17. In a dynamo-electric machine or motor, an open armature-circuit connected at main terminals to insulated ring-contacts, and a field-circuit included between the two halves of said armature-circuit and connected thereto through fixed brushes bearing upon the opposite segments of a reversing-commutator, to all the alternate segments of which the inner terminal of one half the armature-coils is connected, the terminal of the other half of said armature-coils being connected to all the remaining segments of said commutator.

18. A dynamo-electric machine or motor having an open point in its field-magnet or armature-circuit and a fixed external loop-circuit connected thereto, a series of fixed consequent poles in one of its elements, and a commutator for producing alternate polarity in the other element and electrically connected with another external circuit, whereby when the machine is operating alternating currents will circulate in one external circuit and direct currents in the other.

In witness whereof I have hereunto signed my name in the presence of two subscribing witnesses.

FRANCIS JARVIS PATTEN.

Witnesses:
 JOS. WETZLER,
 T. C. MARTIN.